United States Patent
Shukla et al.

(10) Patent No.: US 9,171,182 B2
(45) Date of Patent: Oct. 27, 2015

(54) DYNAMIC DATA MASKING

(71) Applicant: TATA CONSULTANCY SERVICES LIMITED, Mumbai (IN)

(72) Inventors: Manish Shukla, Hadapsar (IN); Joel Joseph, Hadapsar (IN); Kumar Vidhani, Hadapsar (IN); Vijayanand Mahadeo Banahatti, Hadapsar (IN); Sachin Lodha, Hadapsar (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 14 days.

(21) Appl. No.: 14/066,392

(22) Filed: Oct. 29, 2013

(65) Prior Publication Data

US 2014/0123303 A1    May 1, 2014

(30) Foreign Application Priority Data

Oct. 31, 2012   (IN) .................. 3170/MUM/2012

(51) Int. Cl.
G06F 7/04       (2006.01)
G06F 17/30      (2006.01)
H04N 7/16       (2011.01)
G06F 21/62      (2013.01)

(52) U.S. Cl.
CPC .................. G06F 21/6254 (2013.01)

(58) Field of Classification Search
CPC .............................. G06F 21/6254
USPC ............................................. 726/26
See application file for complete search history.

(56) References Cited

U.S. PATENT DOCUMENTS

| | | | |
|---|---|---|---|
| 5,847,972 A * | 12/1998 | Eick et al. .................. 709/246 |
| 6,920,608 B1 * | 7/2005 | Davis ........................ 715/209 |
| 8,321,640 B2 * | 11/2012 | Kwak et al. ................ 711/154 |
| 8,700,985 B2 * | 4/2014 | Leper et al. ................ 715/230 |
| 2005/0289342 A1 * | 12/2005 | Needham et al. ........... 713/169 |
| 2006/0143459 A1 * | 6/2006 | Villaron et al. ............ 713/176 |
| 2009/0292984 A1 | 11/2009 | Bauchot et al. |
| 2010/0205189 A1 * | 8/2010 | Ebrahimi et al. ........... 707/757 |
| 2010/0332993 A1 | 12/2010 | Bousseton et al. |
| 2011/0239113 A1 * | 9/2011 | Hung et al. ................ 715/271 |
| 2012/0151597 A1 * | 6/2012 | Gupta et al. ................. 726/26 |
| 2013/0144901 A1 * | 6/2013 | Ho et al. .................... 707/769 |

* cited by examiner

Primary Examiner — Thanhnga B Truong
Assistant Examiner — Khalil Naghdali
(74) Attorney, Agent, or Firm — Seed IP Law Group PLLC

(57) ABSTRACT

Described is a method for dynamic data masking (DDM) of sensitive data. The method for DDM comprises receiving a response output comprising sensitive data, based on a client request, from an application, and identifying a main masking specification, based on the response output, for masking of the sensitive data in the response output. Further, the response output is parsed for creating a Document Object Model (DOM) tree for the response output. Status of a masking approach indication field of the main masking specification is checked, and masking is performed on nodes in the DOM tree comprising the sensitive data, based on the status of the masking approach indication field of the main masking specification.

15 Claims, 5 Drawing Sheets

DYNAMIC DATA MASKING

TECHNICAL FIELD

The present subject matter relates to dynamic data masking and, particularly but not exclusively, dynamic data masking of sensitive data in web-based applications.

BACKGROUND

Masking techniques for masking data which is sensitive for sharing and disclosing are vastly used for a variety of applications. Masking techniques are used for data testing applications where a real or an original data is masked against disclosure during the testing phase. Further, in recent years, various companies across the globe have progressed to outsource their work to other companies within or outside their countries. With the work being outsourced, companies need to share a variety of data outside, for example, over a network, for execution of tasks by the support or offshore teams. The shared data may include data of customers which may be sensitive for sharing and disclosing. Typically, encryption techniques and administrative controls are employed to allow only authorized users to view such data. However, in some cases even the authorized users should not view all of the data and the sensitive data may have to be protected from disclosure.

In order to protect the sensitive data from disclosure, even to the support or offshore teams, for the execution of tasks, data masking techniques are implemented. Data masking techniques are typically categorized as Static Data Masking (SDM) techniques and Dynamic Data Masking (DDM) techniques. In a SDM technique, the sensitive data is masked, and the masked data is then stored in a database before being displayed to a user based on client's request. On the other hand, in a DDM technique, an application is run to query a database based on a client's request and the sensitive data is masked during the execution of the application and a suitable output is displayed to a user. Although, it may be evident that the DDM techniques are superior and emerging techniques, it may still be important to mask the sensitive data in an efficient manner before being displayed to users and to reduce a risk to disclosure of sensitive data.

SUMMARY

This summary is provided to introduce concepts related to dynamic data masking (DDM) of sensitive data in web-based applications. This summary is neither intended to identify essential features of the claimed subject matter nor is it intended for use in determining or limiting the scope of the claimed subject matter.

In accordance with an embodiment of the present subject matter, a method for DDM of sensitive data is described. The method for DDM comprises receiving a response output comprising sensitive data, based on a client request, from an application, and identifying a main masking specification, based on the response output, for masking of the sensitive data in the response output. The method also comprises parsing the response output for creating a Document Object Model (DOM) tree for the response output. A masking approach indication field of the main masking specification is checked for its status, and masking is performed on nodes in the DOM tree comprising the sensitive data, based on the status of the masking approach indication field of the main masking specification.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the figures to reference like features and components. Some embodiments of systems and/or methods in accordance with embodiments of the present subject matter are now described, by way of example only, and with reference to the accompanying figures, in which.

Figure 1A:
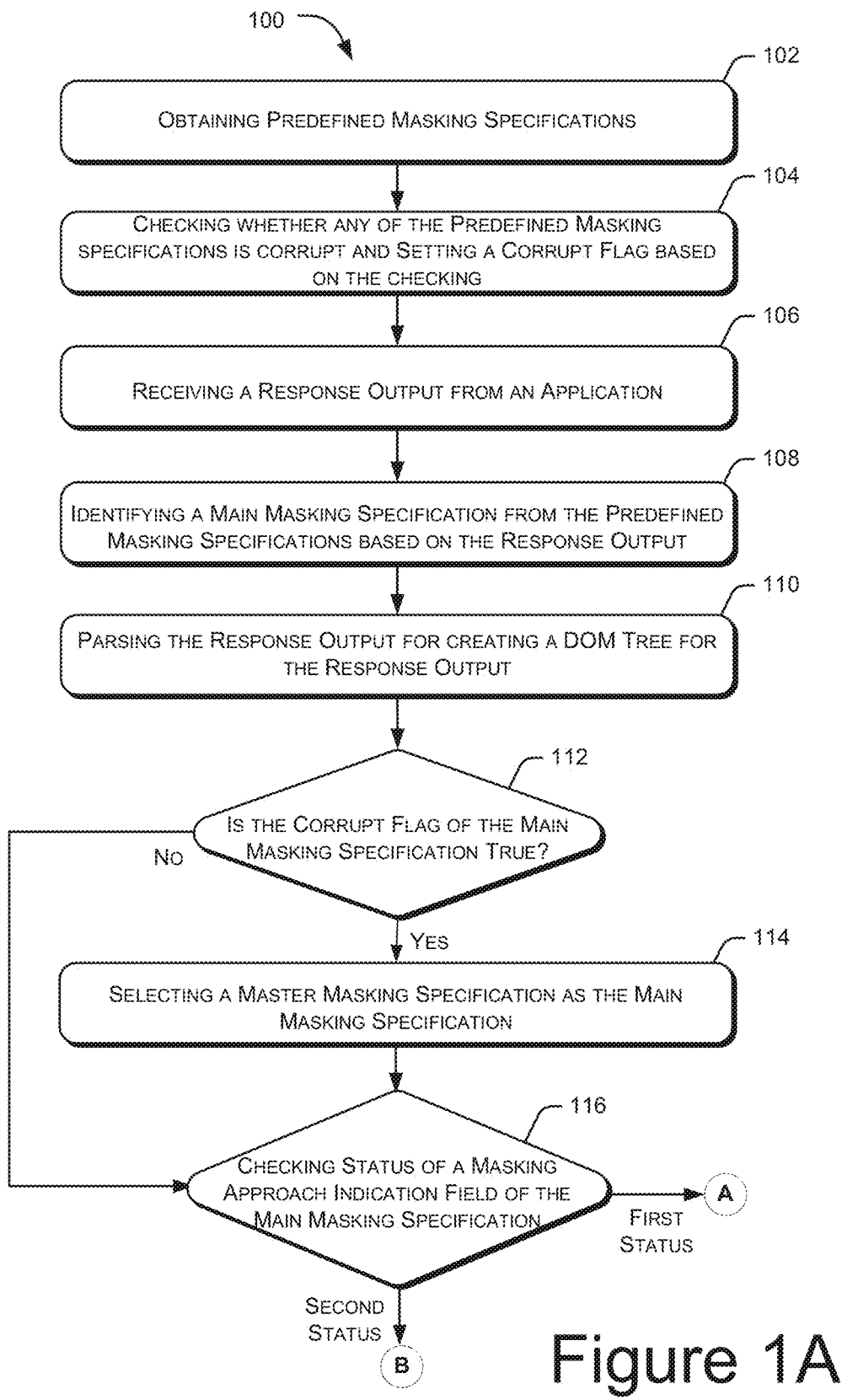
FIGS. 1A, 1B, and 1C illustrate a method for dynamic data masking of sensitive data, according to an embodiment of the present subject matter.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DETAILED DESCRIPTION

The present subject matter relates to systems and methods for dynamic data masking (DDM) in web-based applications. The systems and the methods for DDM of the present subject matter can be implemented in various applications where masking of sensitive data is required. Some examples of applications include data testing and data sharing for service or process outsourcing.

The systems and the methods for DDM of the present subject matter allow the masking of sensitive data in an efficient manner with substantially low risk of leakage of sensitive data to a user. The sensitive data may be private data which may be sensitive for disclosing to a user. A user may be understood as a client (end user), for example, belonging to a support team or an offshore team, which may access a web-based application for obtaining a data for execution of tasks at user's end. For the sake of simplicity, the web-based application hereinafter may be referred to as an application. In an example, the data may be obtained from third-party web services, or from a database, such as a relational database management system, a flat file, and the like.

A DDM method is typically implemented through a DDM-based tool deployed in a computing system. Conventionally, a DDM tool is configured between an application that receives a client request and a database that is being queried. The client request may be in the form of a query, for example, a structured query language (SQL) query. The conventional DDM tool monitors the query directed towards the database, and, based on predefined masking specifications, modifies the query for masking the sensitive data contained in the query output from the database. With this the data is masked at the source level or the database layer.

More importantly, as the conventional DDM tool relies on modification of queries directed towards a database, the modification of queries may lead to change in operation logic (or business logic) defined in the application. The change in operation logic may pose hindrance to a service, provided by the application, which may otherwise require the unmasked data from the database for a similar query. Further, the conventional DDM tool may use a predefined masking logic for the modifications of queries. With such modifications, query optimization efforts, which are otherwise typically done to improve the performance and speed of query execution, may not be applicable. This may adversely affect the speed and performance of the query execution. Further, as the conventional DDM tool relies on modification of queries directed towards a database, the DDM tool may be database specific and may not support all databases.

Further, dynamic masking of sensitive data through conventional DDM tools is not easy as the output data, and the sensitive data in the output data, may not follow a structure. With the unstructured output data, locating sensitive data in the output data may be difficult. Also, at times, conventionally, the application may obtain data from different resources. The data obtained from different resources may be unstructured, which may also lead to difficulties in locating sensitive data from different resources.

Further, in the conventional DDM tools, there is no check or guarantee to ensure that sensitive data would not be leaked. The sensitive data may leak due to faulty or corrupt masking specifications. This makes the conventional DDM tools vulnerable and unreliable for data masking as it may cause business risks and may lead to privacy concerns.

With the above mentioned limitations, the conventional methods for data masking, through conventional DDM tools, are not complete and substantially efficient.

The present subject matter describes systems and methods for DDM of sensitive data in web-based applications. For the purposes of the present subject matter, a web-based application may be understood as an application through which a user or a client may query a database, over a network, for obtaining data from the database.

The methods and the systems for DDM of present subject matter are implemented in a network environment in which a client sends a request for data to a web-based application, also referred to as an application. The application may query a database for obtaining the requested data. The application obtains the data, processes the data, generates a response output, and sends the response output to the client. In an implementation, the response output may be a hypertext markup language (HTML) response output. With the methods and the systems for DDM of the present subject matter, the response output from the application, before being sent to the client, is monitored for any sensitive data therein, and the sensitive data, if any, is masked based on predefined masking specifications. For the purposes of the present subject matter, masking of sensitive data may be understood to include replacing of original data by alternate data, hiding of original data, and making the original data unusable. The predefined masking specifications are predefined rules based on which data in the response output, which is sensitive and is to be masked is identified. The predefined masking specifications also facilitate in locating the sensitive data and may dictate what should appear in place of the sensitive data. After masking the sensitive data in the response output from the application, the masked response output is sent to the client.

The methods and the systems for DDM of the preset subject matter are implemented to mask the sensitive data after the application-side and database-side processing is done, i.e., after the application has retrieved the data from the database based on the query from the client. The methods and the systems for DDM of the preset subject matter do not involve modifications of queries that are sent to the database. This facilitates in overcoming the limitation of changes in the operation logic as posed in the conventional DDM tools, and also in effectively incorporating query optimization efforts for maintaining the speed and performance of query execution. Further, as the queries directed towards the database are not modified, the methods and the systems for DDM of the present subject matter may support any type of database.

In an implementation, the response output, from an application that queries a database based on a client request, is received by the system of the present subject matter for masking of sensitive data before being sent to the client. For the purpose of masking of sensitive data in the response output, masking specification files, having a plurality of predefined masking specifications, are read and obtained by the system of the present subject matter. In an implementation, the predefined masking specifications may be obtained from the application. Based on the response output, one of the predefined masking specifications is identified as a main masking specification which may be utilized for the masking of sensitive data in the response output.

After receiving the response output and identifying the main masking specification for masking of sensitive data in the response output, the response output is parsed for creating a Document Object Model (DOM) tree for the response output. A DOM tree is a tree-like hierarchical structure that represents the response output as a collection of nodes. The nodes of the DOM tree may include data nodes and non-data nodes. The non-data nodes have no data associated with them. Such non-data nodes correspond to empty block in the response output that provide layout or structure to the response output. The data nodes have data associated with them, which may correspond to displayable data, like displayable values, displayable texts, displayable image, displayable hyperlink, selection boxes and input boxes, of the response output. Based on the complexity of the response output, the DOM tree may have a root-node with one or more branches of the root-node. Each branch may have one or more child-nodes, and each child-node may have one or more further child-nodes and/or one or more sibling-nodes. The concept of DOM tree and its creation is understood to a person skilled in the art; hence not described in details in the description herein for the sake of brevity.

In an implementation, before parsing the response output for the creation of DOM tree, it is identified whether the response output is a response for an asynchronous javascript and extensible markup language (AJAX) request. The response to the AJAX request may be referred to as an AJAX response. In said implementation, the parsing of the response output for creation of DOM tree may be based on the identification of the AJAX response.

Further, for masking the sensitive data in the response output in accordance with the present subject matter, nodes, i.e., the data nodes, in the DOM tree which correspond to sensitive data are located, and masking is performed on such nodes in the DOM tree.

The main masking specification may have information about masking approach to be followed for the masking of sensitive data. The information about the masking approach may be in the form of a masking approach indication field in the main masking specification. The masking approach indication field is pre-set while the masking specification is configured. The status of the masking approach indication field is indicative of the approach to be followed for locating the nodes with the sensitive data and masking of the sensitive data in the located nodes. Based on the status of the masking approach indication field in masking specification, the masking is carried out either through annotation and masking of DOM tree nodes process or using location identification paths in the main masking specification, in accordance with the description of the present subject matter.

The masking approach indication field of the main masking specification may be represented in the form of an alphanumeric number which is coded to indicate the masking approach to be followed. In an example, the masking approach indication field may be represented in the form of one or more bits in a binary or any other number system. The masking approach indication field may have a first status which indicates the masking of sensitive data is to be performed through annotation and masking of DOM tree nodes process, or may have a second status, different from the first status, which indicates the masking of sensitive data is to be performed using the location identification paths in the main masking specification. In an example, the first status may be represented as number '1', and the second status may be represented as number '2'.

For the purpose of masking, the status of the masking approach indication field of the main masking specification is checked. In an implementation, if the masking approach indication field has the first status then all the nodes in the DOM tree are traversed and an intermediate-node (Node) for each of the nodes in the DOM tree is created. The INodes may form an intermediate tree representation corresponding to the DOM tree. Each INode may be a metadata wrapper which is created and associated with one node in the DOM tree. Each Node, after its creation, is annotated with a plurality of attributes associated with the corresponding node in the DOM tree. The process of creation and annotation of INode continues recursively till INodes for all the nodes in the DOM tree are created and annotated with the plurality of attributes.

The plurality of attributes may at least include a type of node, sensitivity index, and a masking rule. The type of node may be indicative of whether the node is a text-node, an HTML element, such as a button, a hyperlink, an image, a selection box, and an input box, or the like. The sensitivity index in the annotated INode may be based on the type of node and based on the main masking specification. The sensitivity index may be indicative of whether the node is both label and value sensitive, only label sensitive, only value sensitive or not sensitive. A label is a text-field or an HTML element in the response output against which a data value may be present, and a value is a text-field or an HTML element that represents a data value of a label. In an example, the response output may have an account number of a customer. The text-field "account number" is the label, and the actual number is the value. Further, the masking rule in the annotated INode may be based on the sensitivity index and the main masking specification. As mentioned earlier, the masking rule may be indicative of a masking logic for masking of sensitive data in the node. The procedures of annotation of the above mentioned attributes to the Nodes, like the annotation of the sensitivity index and the masking rule based on the main masking specification, are described in detail later in the description.

Further, based on the annotation of the INodes, Nodes which are annotated as both label and value sensitive, or as only label sensitive, or as only value sensitive (for example in case of HTML element type nodes) are identified as sensitive-Nodes. Based on the identification of sensitive-INodes, the sensitive-INodes with the associated attributes are maintained and stored in a masking nodes list, which may be utilized during masking of the nodes in the DOM tree.

Further, it may be understood that the masking is performed only on text-nodes and HTML element type nodes which have sensitive data. Thus, in an implementation, after the annotation of all the INodes, the intermediate tree representation may be optimized by removing one or more Nodes which are non-sensitive. The optimization of the intermediate tree representation by removing of such Nodes enables in reduction of number of Nodes that may be traversed during the masking of nodes in the DOM tree. This facilitates in substantially reducing the processing time for masking of nodes in the DOM tree, thereby improving the performance of the method and the system for DDM of the present subject matter.

Now, after the annotation of INodes in the DOM tree, identification of sensitive-INodes, and optimization of intermediate tree representation, masking on nodes in the DOM tree is performed. The masking may be performed based on the sensitivity index and the masking rule in the Nodes associated with the nodes.

In an implementation, for the purpose of performing masking on the nodes, the sensitive-INodes are identified from the masking nodes list. For each of the identified sensitive-INode, the masking rule associated with the sensitive-INode, is fetched from the masking nodes list. The masking rule may be indicative of a direction of search for searching of sensitive-INode which are value sensitive. The direction of search may be identified from the masking rule, sensitive-INodes which are value sensitive are searched, and the values of nodes in the DOM tree, corresponding to the searched sensitive-INodes, are masked. For the masking of values, a masking logic may be fetched from the masking rule associated with the corresponding sensitive-INode. The masking logic may be indicative of the data value that shall appear in place of the sensitive data. The DOM tree after masking of values in the sensitive-nodes may be referred to as the masked DOM tree.

Further, in an implementation, if masking approach indication field has the second status, then the masking of the sensitive data is performed using the location identification paths. The main masking specification has information related to location identification paths based on which sensitive values in the response output or the sensitive nodes in the DOM tree can be located. Such paths may be referred to location identification paths. Each location identification path is a unique path for a specific sensitive data or sensitive node. In an implementation, the location identification paths for the sensitive data may be part of masking rules in the predefined masking specifications. The masking rules also have masking logics for masking of sensitive data. The location identification paths, in addition to the masking logics, may be configured in the masking rules for the purpose masking of sensitive data in the response output.

For the purpose of masking, if the masking approach indication field has the second status then the masking rules from the main masking specification are obtained, and nodes in the DOM tree are located based on the location identification paths in the masking rules. The nodes which are located based on the location identification paths are referred to as sensitive nodes in the DOM tree. For each located sensitive node in the DOM tree, value of the sensitive node is masked. The masking of the value is based on the masking rule and, particularly, based on the masking logic in the masking rule.

Further, after masking the values of the nodes in the DOM tree in accordance with the present subject matter, a response stream is generated based on the performing of masking of nodes in the DOM tree. In an implementation, the masked DOM tree is serialized to form the response stream. The response stream is then sent to the client.

With the creation of DOM tree for the response output, annotation of all the associated INodes with the plurality of attributes, searching of sensitive-INodes, and masking of data of the nodes, in the DOM tree, corresponding to the sensitive- INodes, the method and the system for DDM of the present subject matter allow for dynamic masking of sensitive data in the response output even if the response output does not follow any structure and irrespective of their source or the type of database from which the data to be masked is obtained. Also, locating sensitive data in the response output is made substantially easy with the creation of the DOM tree and either by the annotation of at least the sensitivity index to the INodes or by the location identification paths in the masking specification. With all of the above, the method and the system of the present subject matter are substantially more efficient in comparison to the conventional DDM methods and systems.

Further, in an implementation, after the masking specification files are obtained by the system of the present subject matter from the application, the predefined masking specifications therein are parsed and checked for whether any of the masking specifications is corrupt or tampered with. A masking specification which is corrupt or tampered with may not allow the desired masking of sensitive data in the response output, and the sensitive data without any masking may be leaked to the client. In an implementation, a flag, for example, a corrupt flag, associated with that masking specification is set based on the checking.

Further, in an implementation, for the purpose of masking the sensitive data or nodes in the DOM tree, the corrupt flag associated with the main masking specification is checked. Based on the corrupt flag, a master masking specification may be selected and considered as the main masking specification for the purpose of masking sensitive data or nodes in the DOM tree. The master masking specification functions as fallback masking specification if the originally selected main masking specification is identified to be corrupt or tampered with. The master masking specification may be configured with masking rules and masking logics which may be stricter than those of other predefined masking specifications. Thus, with the checking of the main masking specification for being corrupt or tampered with, and utilization of the master masking specification for data masking, leakage of any sensitive data in the response output is prevented. This makes the methods and the systems for DDM of the present subject matter substantially more reliable than the convention DDM methods and systems.

These and other advantages of the present subject matter would be described in greater detail in conjunction with the following figures. It should be noted that the description and figures merely illustrate the principles of the present subject matter.

Figure 1B:
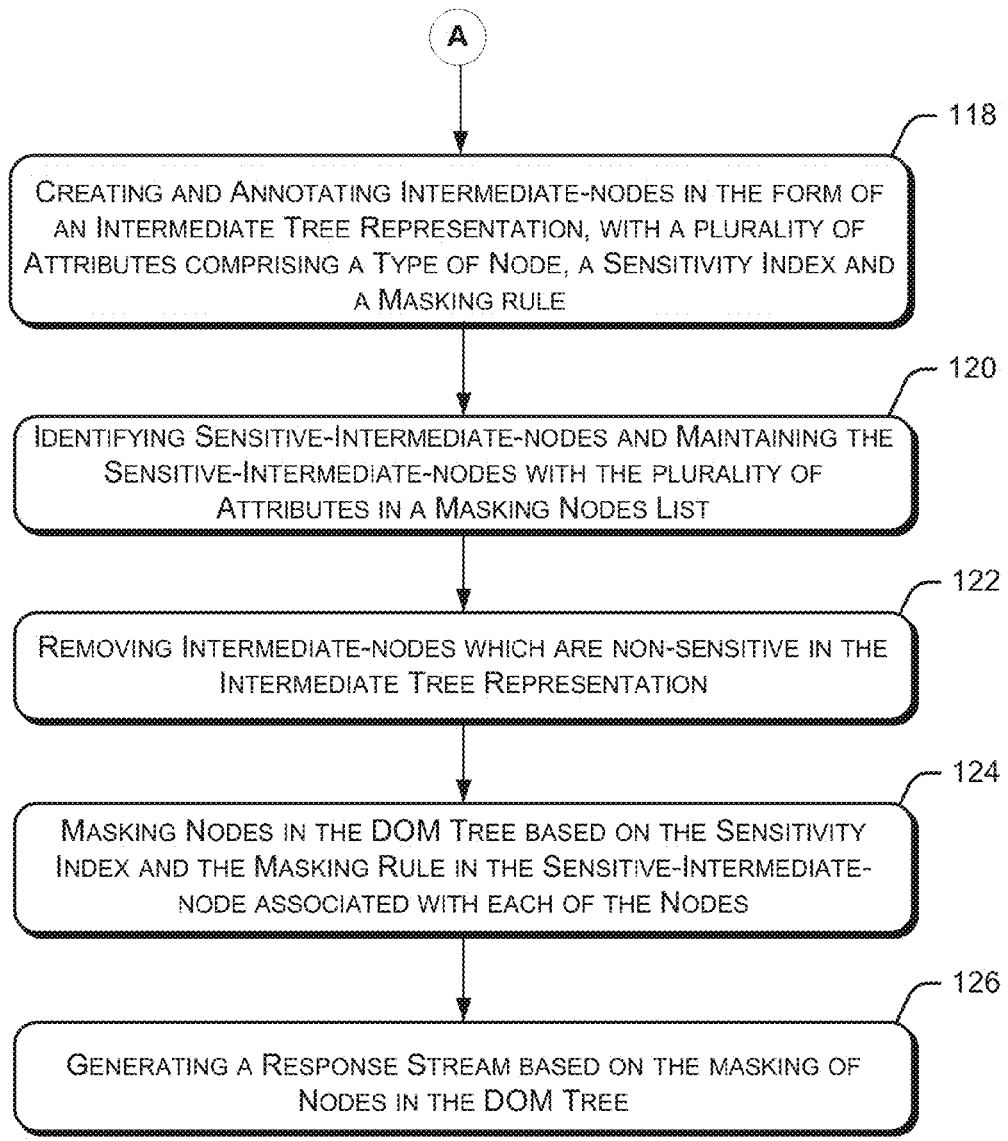
Figure 1C:
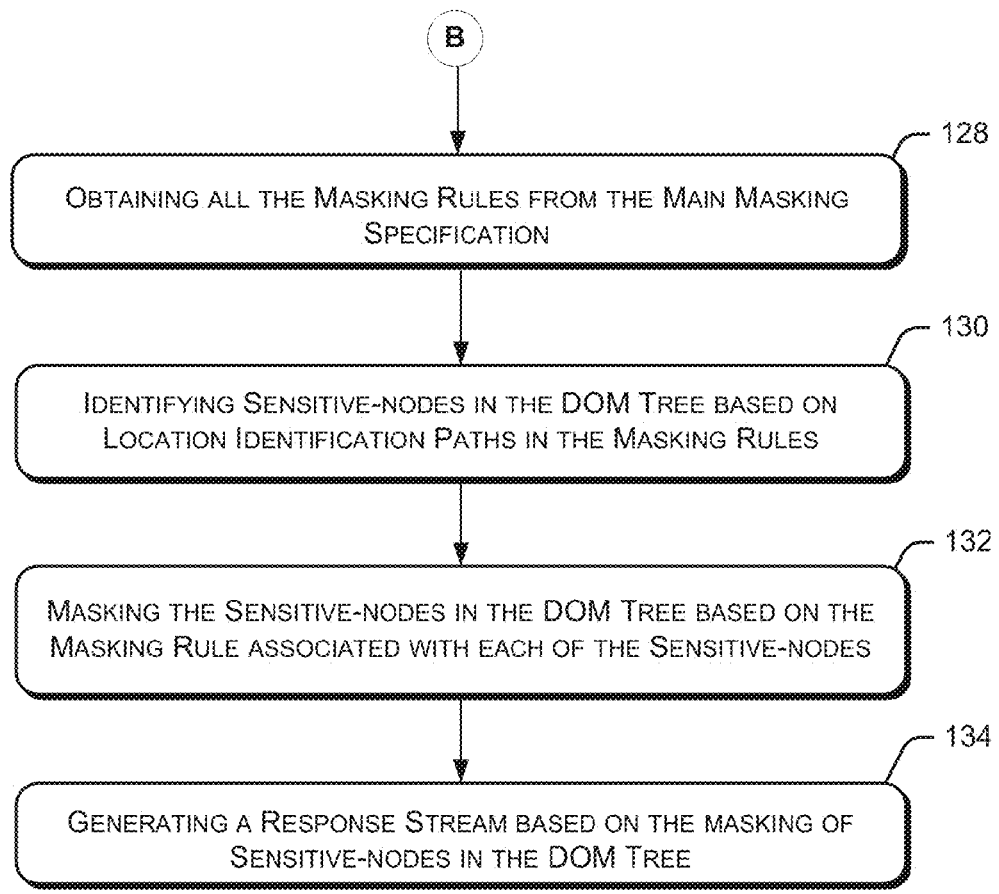

FIGS. 1A, 1B, and 1C illustrate a method 100 for DDM of sensitive data, according to an embodiment of the present subject matter. The method 100 may be implemented in a DDM system which is described later in the description with reference to FIG. 3.

The method 100 may be described in the general context of computer executable instructions. Generally, computer executable instructions can include routines, programs, objects, components, data structures, procedures, modules, and functions that perform particular functions or implement particular abstract data types. The method 100 may also be practiced in a distributed computing environment where functions are performed by remote processing devices that are linked through a communications network. In a distributed computing environment, computer executable instructions may be located in both local and remote computer storage media, including memory storage devices.

The order in which the method 100 is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the method 100 can be implemented in any suitable hardware, software, firmware, or combination thereof.

At block 102, masking specification files are obtained from an application. The application may reside in an application server. In an implementation, the masking specification files may be read and obtained at the start-up of the application and cached in a memory for further usage for data masking. The masking specification files include a plurality of predefined masking specifications. As mentioned earlier, the sensitive data in the response output is masked based on the masking specifications.

After obtaining the masking specification files, the predefined masking specification therein are parsed and checked for whether any of the masking specifications is corrupt or tampered and a corrupt flag associated with each masking specification is set based on the checking, at block 104. In an example, if any of the masking specifications is identified to corrupt or tampered with, the corresponding corrupt flag is set as 1 to indicate a high or true status, otherwise the corrupt flag is set as 0 to indicate a low or false status.

At block 106, a response output is received from the application that queries a database based on a client request. The response output may have sensitive data therein. In an implementation, the sensitive data may include text data, buttons, images, hyperlinks, selection boxes, input boxes, and such, which may need to be masked from being displayed to a client for privacy reasons. In an example, the text data may include personal or private details, like bank account details, various insurance details, employment details, personal identification details, and such.

Further, in an implementation, the response output may be an HTML response output, like a web-page. The HTML response output has displayable elements (text, images, buttons, hyperlinks, input boxes, selection boxes) and a script language code. In an implementation, the response output may be an AJAX response. In an example, the AJAX response may contain HTML fragments.

After obtaining the predefined masking specifications and receiving the response output for data masking, a main masking specification is identified from the predefined masking specifications, at block 108, based on the response output. The masking specification may be read and selected from the cached memory that stores all the masking specification files having the predefined masking specifications. As mentioned earlier, the main masking specification is utilized for masking of sensitive data in the response output.

In an implementation, the response output is checked for uniqueness. An HTML response output may have a unique page identifier which is set during the creation of the HTML response. The unique page identifier may be set based on the requirements of masking of sensitive data. In an example, such a unique page identifier of the response output may be checked for uniqueness of the response output. The main masking specification may be identified from the predefined masking specification based on the uniqueness of the response output.

After this the response output is parsed for creation of a DOM tree. In an implementation, before creating the DOM tree of the response output, it may be identified whether the response output is an AJAX response. If the response output is identified as an AJAX response, then the contents are extracted from the AJAX response for the purpose of creation of the DOM tree.

At block 110, the response output is parsed for creating the DOM tree. With this, the response output is represented as the DOM tree having a collection of nodes. Referring to the foregoing description, for an AJAX response the DOM tree is based on the extracted contents. The DOM tree may be created based on any conventionally known procedure. The concept of creation of DOM tree is well known to a person skilled in the art, and hence not described in details herein. As mentioned earlier, the DOM tree has a root-node and, based on the complexity of the response output, the root-node has one or more child-nodes. Each child-node may have one or more further child-nodes. The child-nodes of a common node (a parent-node) may be understood as sibling-nodes. The nodes of the DOM tree may or may not represent data. The data represented by the nodes may be a displayable data, like a text, a value, a button, a hyperlink, an image, a selection box, an input box, and such, of the response output. Such nodes are referred to as data nodes. It may be possible that a node may correspond to a node having no text or value. Such nodes are referred to as non-data nodes or empty nodes.

After the DOM tree is created, the sensitive data in the nodes in the DOM tree may be masked. For this, at block 112, status of corrupt flag in the main masking specification is checked. As mentioned earlier, the status of the corrupt flag is indicative of corrupt or tampered masking specification. If the status of the corrupt flag of the main masking specification is true, i.e., 1 ('Yes' branch from block 112), a master masking specification is selected and replaced as the main masking specification for masking of sensitive data at block 114.

As mentioned earlier, the master masking specification functions as fallback masking specification if the originally identified main masking specification is found to be corrupt or tampered with. In an implementation, the master masking specification may be configured with a masking logic that may be stricter than those of other predefined masking specifications. For example, the master masking specification may be indicative of all text-nodes and HTML element-nodes as label and value sensitive. Based on this, the masking rule may indicate to masking text, image, button, hyperlink, selection box, and input box, of all the nodes. In an implementation, the master masking specification is obtained as a master masking specification file from the application at the time of reading and obtaining of the other masking specification files. The method 100 from block 114 proceeds to block 116 for further checking in the main masking specification as described ahead in the description.

If the status of the corrupt flag of main masking specification is false, i.e., 0 ('No' branch from block 112), the method 100 proceeds to block 116 at which status of masking approach indication field of the main masking specification is checked. The status of the masking approach indication field is indicative of whether the main masking specification has information about the location identification paths of sensitive data or sensitive nodes in the DOM tree. The masking of sensitive data of nodes in the DOM tree is performed based on the status of the masking approach indication field of the main masking specification.

If the masking approach indication field of main masking specification has a first status, for example, as '1' ('First Status' branch from block 116), the method 100 proceeds to block 118 at which Nodes for all the nodes in the DOM tree are created and each INode is annotated with a plurality of attributes associated with the corresponding node in the DOM tree. For this, all the nodes in the DOM tree are traversed one-by-one, and the Node for each node is created and annotated with the plurality of attributes. The INodes may be created to form an intermediate tree representation corresponding to the DOM tree. As mentioned earlier, the plurality of attributes, which are annotated in each INode, at least includes a type of node, a sensitivity index, and a masking rule. Amongst other attributes, the plurality of attributes may also include a node index, a reference to parent-node, a reference to child-nodes, a reference to sibling-nodes, and a visited flag. The node index is indicative of a sequence number of the corresponding node in the DOM tree. The reference to parent, child or sibling-node is indicative of the parent-node, child-nodes and sibling-nodes associated with the node in the DOM tree. The visited flag is indicative of whether the node in the DOM tree is visited for the annotation purposes.

Further, in an implementation, each node in the DOM tree is checked for any text, image, hyperlink, button, selection box, input box, and such, associated with it. If the node has a text associated with it, the associated INode is annotated as a text-node as the type of node. Similarly, if the node is an HTML element, for example, an image, a hyperlink, a button, a selection box, an input box, and such, the associated Node is annotated as an HTML element-node as the type of node.

Further, in an implementation, each associated INode is annotated with a sensitivity index based on the type of node and based on the main masking specification identified based on the response output. An Node is annotated with a sensitivity index only if the node is a text-node or an HTML element-node. For the text-nodes and the HTML element-nodes, the text and the HTML element therein is checked and, based on the information in the main masking specification, sensitivity index is annotated. The main masking specification is indicative of whether a text or the HTML element of the node is both label and value sensitive, only label sensitive, only value sensitive, or not sensitive. If the text or the HTML element of the label and the text or the HTML element of the value of the node are sensitive then the sensitivity index annotated is label-value sensitive. If only the text or the HTML element of the label of the node is sensitive then the sensitivity index annotated is label sensitive. Further, if only the text or the HTML element of the value of the node is sensitive then the sensitivity index annotated is value sensitive. And, if the text, or the HTML element, of neither the label nor the value of the node is sensitive then the sensitivity index annotated is non-sensitive.

Further, in an implementation, each associated INode is annotated with a masking rule based on the annotated sensitivity index and based on the main masking specification identified based on the response output. An Node is annotated with a masking rule only if the INode is annotated with a sensitivity index of any one other than non-sensitive. The main masking specification is indicative of the masking rule associated with each of the sensitivity index. Thus, depending on the sensitivity index in the Node, the masking rule is annotated with it from the main masking specification.

The description hereinafter describes the process of creation and annotation of the INodes, in accordance with an implementation of the present subject matter. At first, it is identified whether the root-node of the DOM tree has one or more child-nodes. If the root-node has no child-node then the DOM tree is serialized and the response is sent to the client. It may be understood that if the root-node has no child-node then the response output has no text or HTML element to be masked. Thus, no masking is performed and the response output is sent as it is to the client.

Further, if the root-node has one or more child-nodes, then for each of the child-node an INode is created, and it is identified whether the child-node is a text-node or an HTML element-node. If a child-node is identified as a text-node or an HTML element-node then the corresponding INode is annotated with the sensitivity index, and also with the masking rule, depending on the sensitivity index, as described above. If a child-node is identified as a non-text-node or a non-HTML element-node then no further attributes are annotated to that INode, and it is identified whether the child-node has one or more further child-nodes. For each of the further child-nodes, it is iteratively identified whether the further child-node is a text-node or an HTML element-node. If a further child-node is identified as a text-node or an HTML element-node then a corresponding INode is created and annotated with the sensitivity index, and also with the masking rule, depending on the sensitivity index, as described above.

If a further child-node is identified as a non-text-node or a non-HTML element-node then no further attributes are annotated to the INode, and it is identified whether the child-node has one or more sibling-nodes. For each of the sibling-nodes, it is iteratively identified whether the sibling-node is a text-node or an HTML element-node. If a sibling-node is identified as a text-node or an HTML element-node then a corresponding INode is created and annotated with the sensitivity index, and also with the masking rule, depending on the sensitivity index, as described above.

Continuing with the method 100, at block 120, sensitive-INodes in the intermediate tree representation are identified, and the sensitive-INodes with the plurality of attributes are stored and maintained in a masking nodes list. As mentioned earlier, the sensitive-INodes are intermediate nodes which are annotated either as label-value sensitive or as label sensitive or as value sensitive. In an implementation, the attributes of the sensitive-INodes are stored in the masking nodes list, which may be referred for masking of nodes in the DOM tree.

Further, at block 122, the Nodes which are non-sensitive in the intermediate tree representation are removed for optimizing the intermediate tree representation. The optimization of intermediate tree representation by removal of non-sentsitive-INodes reduces the size of the intermediate tree representation to have only the sensitive-INodes, i.e., those INodes which are sensitive and are to be masked. In an implementation, for removing the INodes from the intermediate tree representation, the linearity of the Nodes is checked. An INode is considered non-linear if the branch of the intermediate tree representation, in which the INode is located, does not contain any sensitive information.

Further, at block 124, nodes in the DOM tree are masked based on the sensitivity index and the masking rule in the Node associated with the each of the nodes in the DOM tree. The masking is performed only on the nodes in the DOM tree for which the INodes in the intermediate tree representation are the sensitive-INodes. Thus, for the purpose of masking, the masking nodes list is referred and the nodes are masked based on the sensitive-INodes.

In an implementation, for each of the identified sensitive-INode, the associated masking rule is fetched from the sensitive-INode in masking nodes list. As mentioned earlier, the masking rule is indicative of a direction of search for searching of sensitive-INodes which are value sensitive. The direction of search is identified from the masking rule, the sensitive-INode which are value sensitive are searched, and values of the nodes in the DOM tree, corresponding to the sensitive-INodes which are value sensitive, are masked.

In an implementation, the direction of search may include right direction, down direction, left direction, or up direction. For example, the right direction and the left direction indicate that the search for the value sensitive-INodes is to be conducted towards the right direction and the left direction, respectively. With the direction of search as the right direction or the left direction, the search for the value sensitive-Nodes is conducted in the sibling-INodes of the sensitive-INode and, subsequently, in the child-INodes of the sibling-INodes. Further, the down direction and the up direction indicate that the search for the value sensitive-INodes is to be conducted towards the downward direction and the upward direction, respectively. With the direction of search as the down direction or the up direction, the search for the value sensitive-INodes is conducted in parent-sibling-INodes of the sensitive-INode. The parent-sibling-INodes are the sibling-INodes that are parent to one or more child-INodes.

The description below describes the process of searching the value sensitive-INodes and masking of values in the nods in the DOM tree based on the direction of search, according to an implementation of the present subject matter. If the direction of search is a right direction or a left direction, all the sibling-INodes, of the sensitive-INode, are fetched. For each of sibling-INodes, it is iteratively identified whether the sensitivity index in the sibling-INode is value sensitive. If the sensitivity index is identified as value sensitive, a masking logic from the masking rule in the Node associated with the sibling-INode is fetched. The masking logic is applied for the masking of a value of the node in the DOM tree, associated with the sibling-INode. As mentioned earlier, the masking logic may be indicative of the data value that shall appear in place of the sensitive data.

In an example, the value may represent an account number of a customer. The masking logic may indicate to mask or replace first six digits of the account number by a predefined character, for example, 'Y', and keep the remaining digits of the account number as it is.

In another example, the value may represent a hyperlink. The masking logic may indicate to mask the hyperlink by making the hyperlink unusable.

In another example, the value may represent an image. The masking logic may indicate to mask the image either by replacing the original image by an alternate image or not displaying the image.

In another example, the value may represent a selection box, like a dropdown box, or an input box. The masking logic may indicate to mask the selection or the input box by hiding the box or by making the box inactive for selection or input.

In another example, the value may represent a button. The masking logic may indicate to mask the button by either hiding the button or by making the button inactive for pressing.

Further to this, for each of the sibling-INodes, all the child-INodes are fetched. For each child-INode of each of the sibling-INodes, it is iteratively identified whether the sensitivity index of the child-INode is value sensitive. If the sensitivity index is identified as value sensitive, a masking logic from the masking rule in the Node associated with the child-INode is fetched, and the masking logic is applied for the masking of a value of the node in the DOM tree, associated with the child-INode.

Now, if the direction of search is a down direction or an up direction, all the parent-sibling-INodes, of the sensitive-INode, are fetched. For each of the parent-sibling-INodes, all child-INodes are fetched. For each child-INode of each of the parent-sibling-INodes, it is iteratively identified whether the sensitivity index of the child-Node is value sensitive. If the sensitivity index is identified as value sensitive, a masking logic from the masking rule in the INode associated with the child-INode is fetched, and the masking logic is applied for the masking of a value of the node in the DOM tree, associated with the child-INode.

In an implementation, the masking specification may be configured by a user. The user may configure the masking rules, the masking logics, sensitivity logic for masking of sensitive data in the response output, based on the business requirements.

After masking the values of the nodes in the DOM tree, a response stream is generated by serializing the masked DOM tree at block 126. The response stream is then sent to the client as a response to the client request received by the application.

If the masking approach indication field of main masking specification has a second status, for example, as '2' ('Second Status' branch from block 116), the method 100 proceeds to block 128 at which all the masking rules from the main masking specification are obtained. Each of the masking rules may have a location identification path that indicates the location of a sensitive data or a sensitive node in the DOM tree. The second status of the masking approach indication field is different from the first status of the masking approach indication field.

In an implementation, the location identification path may be pre-configured in the masking rules using a query language for locating the sensitive nodes in the DOM tree. Each location identification path provides the ability to navigate around the DOM tree and to locate the sensitive node in the DOM tree. A location identification path may be pre-configured based on one or more criteria or attributes of a sensitive node. The criteria or the attributes may be indicative of sensitive nature of the node.

After obtaining the masking rules from the main masking specification, sensitive-nodes in the DOM tree are located, at block 130, based on the location identification paths in the masking rules. For locating sensitive-nodes in the DOM tree, each of the location identification paths in the masking rules is parsed and evaluated over the DOM tree. In an implementation, the location identification paths may be parsed and evaluated through conventional string tokenizing or a conventional third party path parser. Further, the sensitive-nodes located in the DOM tree are stored and maintained in a sensitive nodes list which may be referred for the purpose of masking values of the sensitive-nodes.

Further, after locating the sensitive-nodes in the DOM tree, values of the sensitive-nodes are masked, at block 132, based on the masking rules. For this, the sensitive-nodes are selected one-by-one, and for each selected sensitive-node, the value of the sensitive-node is checked for sensitive using the corresponding masking rule. For such checking, the value of the sensitive-node may be matched with the value pattern in the corresponding masking rule which is sensitive for disclosure. Based on such checking, the value of the sensitive-node may be masked using the masking logic in the masking rule. The value of the sensitive-node may be masked based on the masking logic in a manner as described earlier in the description.

After masking the values of the sensitive-nodes in the DOM tree, a response stream is generated by serializing the masked DOM tree at block 134. The response stream is then sent to the client as a response to the client request received by the application.

Further, in an implementation, a performance of the method 100 for DDM is evaluated. For the evaluation of the performance of the method 100, a complexity of the response output from the application is determined. The complexity of the response output is determined based on a total number of nodes in the DOM tree and on a number of nodes that are masked in the DOM tree. For this, the total number of nodes in the DOM tree is determined after the creation of the DOM tree, and the number of nodes that are masked is determined after the masking procedure. In an implementation, the ratio of number of nodes that are masked to the total number of nodes in the DOM tree may refer to the complexity of the response output. The higher the ratio the higher would be the complexity and the lower would be the performance.

Figure 2:
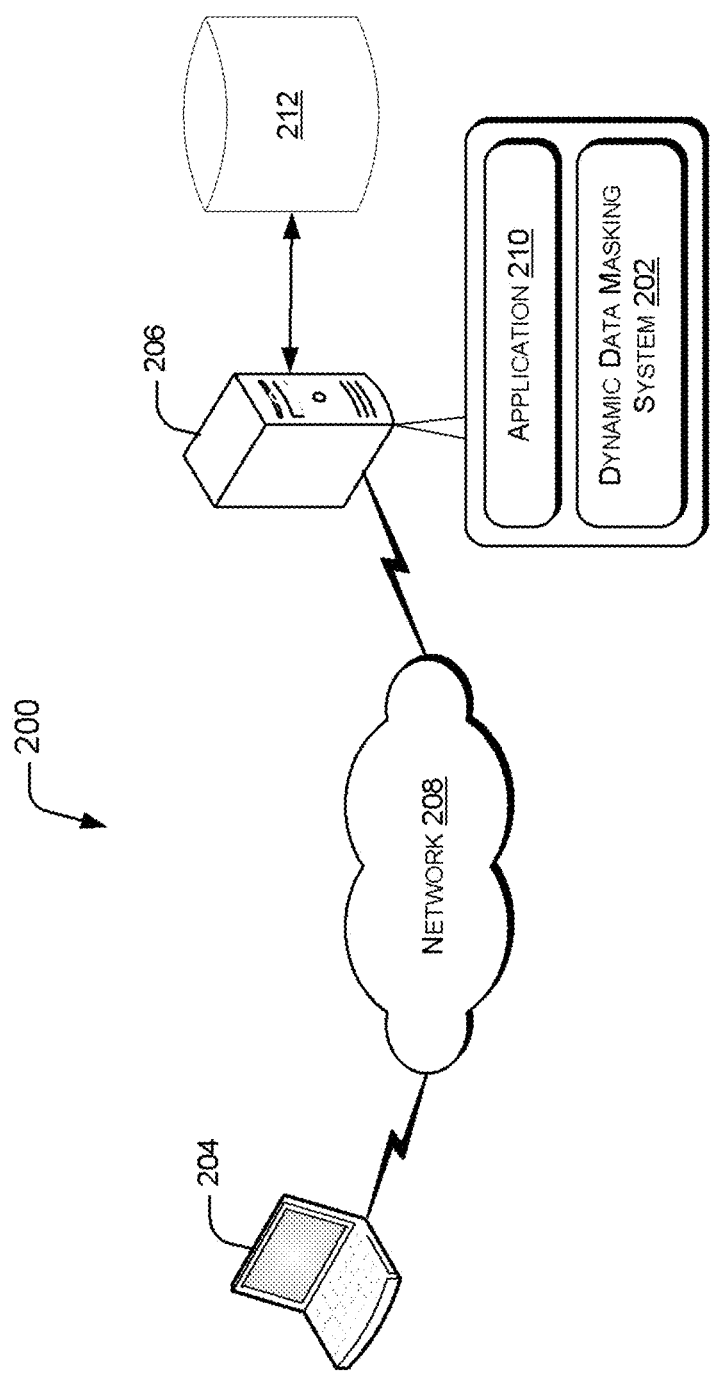
FIG. 2 illustrates a network environment implementing a dynamic data masking system for masking of sensitive data, according to an embodiment of the present subject matter.

FIG. 2 illustrates a network environment 200 implementing a DDM system 202 for masking of sensitive data, according to an embodiment of the present subject matter. The network environment 200 may be understood as a public or a private networking system. As shown, the networking environment 200 may include a user or a client 204 communicatively coupled to an application server 206 over a network 208 through one or more communication links. The client 204 may be a computing device that includes, but is not limited to, a desktop PC, a notebook, a portable computer, a smart phone, a PDA, a tablet, and the like. The application server 206 may be a computing device that includes, but is not limited to, a server, a workstation, and a mainframe computer. The application server 206 may be one, or combination of one or more, storage server or network server.

The network 208 may be understood as a network, including personal computers, laptops, various servers and other computing devices. The communication links between the client 204 and the application server 206 are enabled through a desired form of communication, for example, via dial-up modem connections, cable links, and digital subscriber lines (DSL), wireless or satellite links, or any other suitable form of communication.

Further, the network 208 may be a wireless network, a wired network, or a combination thereof. The network 208 can also be an individual network or a collection of many such individual networks, interconnected with each other and functioning as a single large network, e.g., the Internet or an intranet. The network 208 can be implemented as one of the different types of networks, such as intranet, local area network (LAN), wide area network (WAN), the internet, and such. The network 208 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 208 may include network devices, such as network switches, hubs, routers, and Host Bus Adapters (HBAs), for providing a link between the client 204 and the application server 206. The network devices within the network 208 may interact with the client 204 and the application server 206 through the communication links.

In an implementation, the application server 206 may host an application 210 through which the client 204 may request for data from a database 212. The database 212 may store data depending on the business requirements, for example, for the purpose of outsourcing. Based on a client request, the application 210 queries the database 212 for obtaining the requested data, processes the obtained data, and generates a response output for being sent to the client 204. The DDM system 202 monitors the response output for any sensitive data, and masks the sensitive data, if any, as described in the description hereinafter.

Further, in an implementation, as shown in FIG. 2, the DDM system 202 may be implemented on the application server 206. In another implementation, the DDM system 202 may be implemented external to the application server 206 and accessed for the purposes of dynamic masking of data.

The DDM system 202 may be a software-based implementation or a hardware-based implementation or both.

Figure 3:
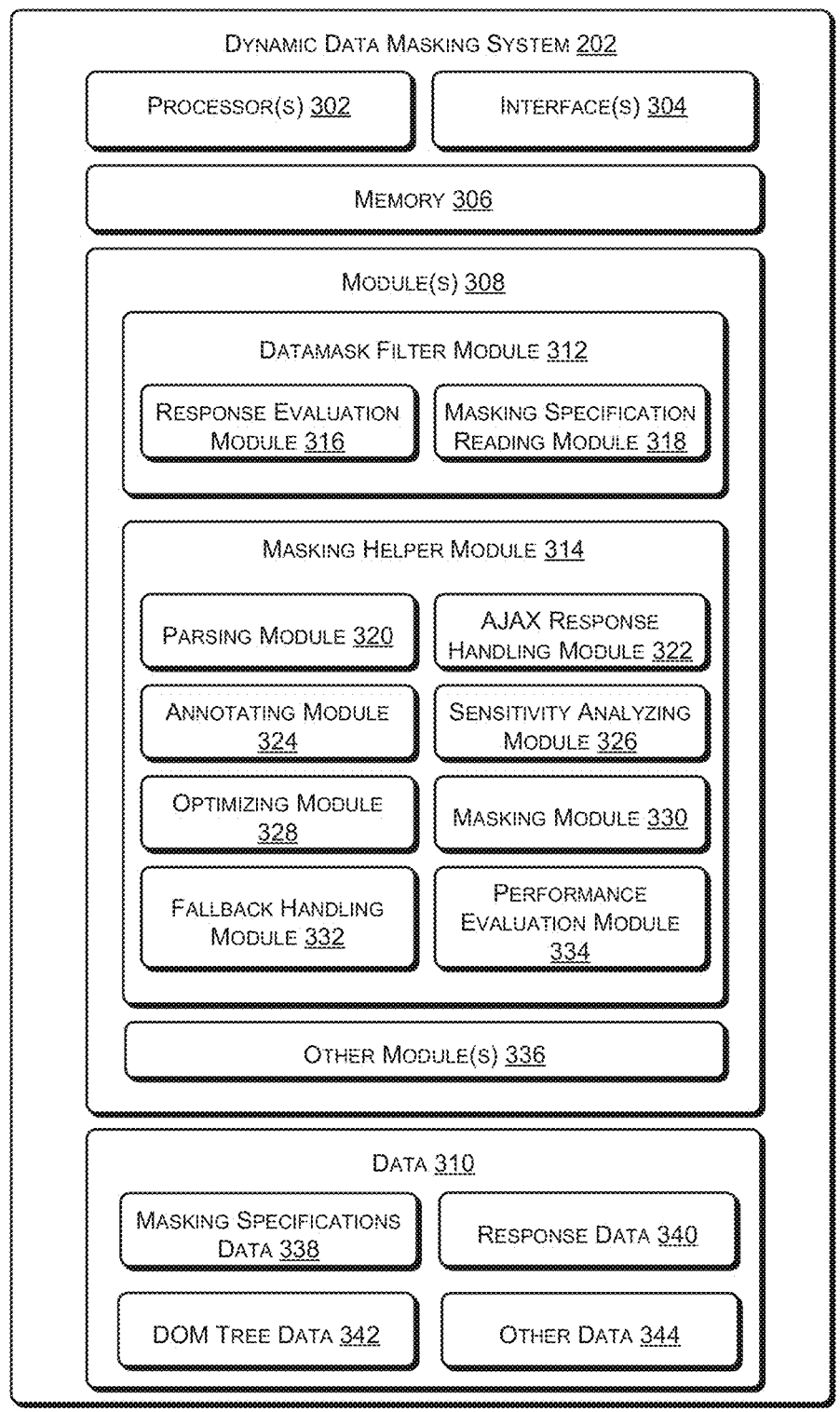
FIG. 3 illustrates the dynamic data masking system, according to an implementation of the present subject matter.

FIG. 3 illustrates the DDM system 202, according to an implementation of the present subject matter. The DDM system 202 includes one or more processor(s) 302, interface(s) 304, and a memory 306 coupled to the processor(s) 302. The processor 302 can be a single processor unit or a number of units, all of which could include multiple computing units. The processor(s) 302 may be implemented as one or more microprocessors, microcomputers, microcontrollers, digital signal processors, central processing units, state machines, logic circuitries, and/or any devices that manipulate signals based on operational instructions. Among other capabilities, the processor 302 is configured to fetch and execute computer-readable instructions and data stored in the memory 306.

Functions of the various elements shown in FIG. 3, including the functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, or by a plurality of sub-processors. Moreover, explicit use of the term "processor" should not be construed to refer exclusively to hardware capable of executing software, and may implicitly include, with a limitation, Digital Signal Processor (DSP) hardware, network processor, Application Specific Integrated Circuit (ASIC), Field Programmable Gate Array (FPGA), Read Only Memory (ROM) for storing software, Random Access Memory (RAM), and non-volatile storage. Other hardware, conventional or custom, may also be included. Further, the processors 302 may include various hardware components, such as adders, shifters, sign correctors, and generators required for executing various applications, such as arithmetic operations.

The interface(s) 304 may include a variety of software and hardware interfaces, for example, interfaces for peripheral device(s), such as a keyboard, a mouse, an external memory, and a printer. The interface(s) 304 may enable the DDM system 202 to communicate with other devices, such as external computing devices and external databases.

The memory 306 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the DDM system 202 includes module(s) 308 coupled to the processor(s) 302, and includes data 310. The modules 308 include routines, programs, objects, components, data structures, and the like, which perform particular tasks or implement particular abstract data types. The modules 308 further include modules that supplement applications on the DDM system 202, for example, modules of an operating system. The data 310, amongst other things, serves as a repository for storing data that may be processed, received, or generated by one or more of the modules 308.

In an implementation, the modules 308 of the DDM system 202 include a datamask filter module 312, a masking helper module 314, and other module(s) 336. The datamask filter module 312 includes a response evaluation module 316 and a masking specification reading module 318. The masking helper module 314 includes a parsing module 320, an AJAX response handling module 322, an annotating module 324, a sensitivity analyzing module 326, an optimizing module 328, a masking module 330, a fallback handling module 332, and a performance evaluation module 334. The other module(s) 336 may include programs or coded instructions that supplement applications and function, for example, programs in the operating system of the DDM system 202.

In an implementation, the data 310 include masking specification data 338, response data 340, DOM tree data 342, and other data 344. The other data 344 includes data generated as a result of the execution of one or more modules in the other module(s) 336.

The response evaluation module 316 is configured to receive a response output from the application 210. The response output is generated by the application 210 upon receiving data from the database 212 based on a request from the client 204. The response output from the application 210 may include sensitive data including text data, buttons, images, hyperlinks, selection boxes, input boxes, and such, which may need to be masked from being displayed to a client for privacy reasons. The response output may be stored in the response data 340.

The masking specification reading module 318 is configured to read and obtain masking specification files from the application 210. The masking specification files have a plurality of predefined masking specifications for masking of the sensitive data in the response output. In an implementation, the masking specification reading module 318 reads and obtains all the masking specification files at the start-up of the application 210. The masking specification files may be stored in the masking specifications data 338.

After obtaining the masking specification files, the masking specification reading module 318 parses the plurality of predefined masking specifications, and checks whether any of the plurality of predefined masking specifications is corrupted. Based on the checking, the masking specification reading module 318 sets a corrupt flag associated with each of the plurality of predefined masking specifications, as described earlier in the specification. The corrupt flag associated with each of the masking specifications is also stored in the masking specifications data 338.

Further, after receiving the response output, and obtaining and checking the predefined masking specifications, the response evaluation module 316 identifies one predefined masking specification as a main masking specification, based on the response output, for masking of sensitive data. In an implementation, the main masking specification is identified based on uniqueness in the response output. For this, the response evaluation module 316 checks for uniqueness in the response output, as described earlier, for identifying the main masking specification.

After this, the parsing module 320 parses the response output for creating a DOM tree for the response output. The DOM tree for the response output may have a root-node and a plurality of other nodes based on the complexity of response output, as described earlier in the description. The data associated with the DOM tree may be stored in the DOM tree data 342.

In an implementation, before the creation of DOM tree, the parsing module 320 may communicate with the AJAX response handling module 322, where the AJAX response handling module 322 identifies whether the response output is an AJAX response. As mentioned earlier, if the response output is an AJAX response, the AJAX response handling module 322 extracts the HTML fragments from the AJAX response. In such a case, the parsing module 320 creates the DOM tree based on the extracted HTML fragments.

For the purpose of masking of sensitive data in the nodes in the DOM tree, the parsing module 320 is configured to check status of the masking approach indication field of the main masking specification, and the masking module 330 is configured to perform masking on the nodes in the DOM tree based on the status of the masking approach indication field of the main masking specification. If the masking approach indication field has a first status, for example, as '1', the masking is performed based on creation and annotation of INodes in the form of an intermediate tree representation corresponding to the DOM tree and masking of nodes in the DOM tree based on the location of sensitive-INodes. If the masking approach indication field has a second status, for example, as '2', the masking is performed based on identification of sensitive-nodes in the DOM tree using location identification paths in the masking rules of the main master specification and masking of sensitive-nodes on the DOM tree based on the masking rules. The details of masking with respect to the DDM system 202 are described hereinafter.

If the masking approach indication field of the main masking specification has the first status, the annotating module 324 is invoked, which is configured to create Nodes for all the nodes of DOM tree in the form of the intermediate tree representation and annotate each INode with a plurality of attributes associated with the corresponding node in the DOM tree. As mentioned earlier, the plurality of attributes, which are annotated with each Node, includes, but is not limited to, a type of node, a sensitivity index, a masking rule, a node index, a reference to parent-node, a reference to child-nodes, a reference to sibling-nodes, and a visited flag. In an implementation, the annotating module 324 is configured to create an INode as a metadata wrapper comprising all the attributes. Further, as mentioned the DOM tree is traversed recursively to create and annotate each INode. The Nodes are annotated as described in detail earlier in the description. The attributes associated within each of the nodes in the DOM tree, i.e., the INodes, may be stored in the DOM tree data 342.

In an implementation, for the annotation of INodes, the annotating module 324 is configured to identify, at first, whether a root-node of the DOM tree has one or more child-nodes. Then for each of the child-nodes, an Node is created and it is identified whether the child-node is a text-node or an HTML element-node. Based on the identification of the child-node as the text-node or the HTML element-node, the corresponding INode is annotated with a sensitivity index as one of the plurality of attributes.

Further, the annotating module 324 is configured to identify, based on the identification of the child-node as a non-text-node or a non-HTML element-node, whether the child-node has one or more further child-nodes. Then, for each of the further child-nodes, iteratively, an INode is created and it is identified whether the further child-node is a text-node or an HTML element-node. Then, based on the identification of the further child-node as the text node or the HTML element-node, the corresponding INode is annotated with a sensitivity index as one of the plurality of attributes.

Further, the annotating module 324 is configured to identify, based on the identification that the child-node has no further child-nodes, whether the child-node has one or more sibling-nodes. Then, for each of the sibling-nodes, iteratively, an INode is created and it is identified whether the sibling-node is a text-node or an HTML element-node. Then, based on the identification of the sibling-node as the text node or the HTML element-node, the corresponding INode is annotated with a sensitivity index as one of the plurality of attributes.

In an implementation, for the purpose of annotation of the sensitivity index, the annotating module 324 may communicate with the sensitivity analyzing module 326. The sensitivity analyzing module 326 may check the text of the text-node and image, button, hyperlink, and such, of the HTML element-node, and, based on the main masking specification, identify whether the text-node and the HTML element-node is both label and value sensitive, only label sensitive, only value sensitive, or not sensitive.

Further, after the annotation of all the Nodes, the annotating module 324 identifies sensitive-INodes in the intermediate tree representation. As mentioned earlier, the sensitivity-INodes are the INodes in which the sensitivity index is one of label-value sensitive, label sensitive, and value sensitive. Based on the identification, the annotating module 324 stores the sensitive-INodes with the plurality of attributes in a masking nodes list, which may be used for performing of masking on nodes in the DOM tree. The masking nodes list may be stored in the DOM tree data 342.

In an implementation, the optimizing module 328 is configured to remove one or more Nodes which are non-sensitive in the intermediate tree representation. With this, the intermediate tree representation is optimized. The optimizing module 328 may refer to attributes in the each of the INodes for removing the non-sensitive INodes. The data associated with the optimized intermediate tree representation may be stored in the DOM tree data 342.

Further, after the annotation of all the Nodes in the intermediate tree representation and identification of sensitive-INodes, the masking module 330 masks on nodes in the DOM tree based on the sensitivity index and the masking rule in the INode associated with each of the nodes in the DOM tree. As mentioned earlier, the masking is performed only on those nodes in the DOM tree for which the associated INodes are sensitive-INodes. Thus, for the purpose of masking, the masking module 330 may refer to the masking nodes list, identify the sensitive-INodes therein, and mask values of the nodes in the DOM tree, associated with the sensitive-INodes. The masking module 330 is configured to mask values of the nodes as described earlier in the specification.

In an implementation, the masking module 330 is configured to fetch, for each sensitive-INode, the masking rule associated with the sensitive-INode from the masking nodes list. From the masking rule, the masking module 330 identifies a direction of search for searching of sensitive-INodes which are value sensitive. Based on the direction of search, the masking module 330 searches the sensitive-INodes which are value sensitive and masks the values of the nodes in the DOM tree associated with the sensitive-INode. The process of searching and masking is as described earlier in the specification.

If the masking approach indication field of the main masking specification has the second status, the masking module 330 is invoked which is configured to obtain all the masking rules from the main masking specification. As mentioned earlier, each of the masking rules may have a location identification path that indicates the location of a sensitive data or a sensitive node in the DOM tree. Based on the masking rules and the location identification paths therein, the masking module 330 locates the sensitive-nodes in the DOM for each location identification path. After locating the sensitive-nodes in the DOM tree, the masking module 330 masks values of the sensitive-nodes in the DOM tree based on the masking logics in the masking rules. The procedure for masking of values of nodes in the DOM tree, based on the masking logics, is described earlier in the description.

Further, as mentioned earlier, in an implementation, the main masking specification is checked for being corrupt or tampered with. For checking the main masking specification for being corrupt, the fallback handling module 332 is invoked which checks the corrupt flag of the main masking specification. Based on the checking of the corrupt flag, the fallback handling module 332 selects a master masking specification as the main masking specification, which may be used for the masking of values of all the nodes in the DOM tree. As mentioned earlier, the master masking specification functions a fallback masking specification if the originally selected main masking specification is identified to be corrupt of tampered with. In an implementation, the master masking specification may be configured with a masking logic that may be stricter than those of other predefined masking specifications. The masking specification reading module 318 may obtain the master masking specification as a master masking specification file from the application 210, at the time of reading and obtaining of the other masking specification files, and store the same in the masking specifications data 338.

After masking the values of nodes in the DOM tree, the masking module 330 is configured to generate a response stream by serializing the masked DOM tree, and the response evaluation module 316 is configured to send the response stream to the client 204.

Further, in an implementation, the performance evaluation module 334 is configured to determine a complexity of response output for evaluation of performance of the DDM system 202 for the masking of sensitive data in the response output. The performance evaluation module 334 may determine the complexity of the response output based on a total number of nodes in the DOM tree and a number of nodes that are masked in the DOM tree. Based on the complexity of response output, the performance evaluation module 334 may evaluate the performance of the DDM system 202.

Although embodiments for the method and system for DDM have been described in language specific to structural features, it is to be understood that the invention is not necessarily limited to the specific features described. Rather, the specific features are disclosed and explained in the context of a few embodiments for the method and system.

Other advantages of the method and system of the present subject matter will become better understood from the description and claims of an exemplary embodiment of the method and system. The method and system of the present subject matter are not restricted to the embodiments that are mentioned above in the description.

Although the subject matter has been described with reference to specific embodiments, this description is not meant to be construed in a limiting sense. Various modifications of the disclosed embodiments, as well as alternate embodiments of the subject matter, will become apparent to persons skilled in the art upon reference to the description of the subject matter. It is therefore contemplated that such modifications can be made without departing from the spirit or scope of the present subject matter as defined.

We claim:

1. A method for dynamic data masking of sensitive data, the method comprising:
receiving, by a processor that is a hardware processor, a response output comprising sensitive data, from an application, based on a query from a client to the application;
identifying, by the processor, a main masking specification, based on the response output, for masking of the sensitive data in the response output;
checking, by the processor, a status of a corrupt flag associated with the main masking specification to ascertain whether the main masking specification is corrupted or tampered;
selecting, by the processor, a master masking specification as the main masking specification when the status of the corrupt flag is corrupted or tampered
parsing, by the processor, the response output for creating a Document Object Model (DOM) tree for the response output;
checking, by the processor, a status of a masking approach indication field of the main masking specification when the status of the corrupt flag is not corrupt or tampered, the main masking approach indication field being indicative of whether the main masking specification has information about location identification paths of nodes comprising the sensitive data in the DOM tree;
performing, by the processor, masking on the nodes in the DOM tree, wherein the performing of masking is based on the status of the masking approach indication field of the main masking specification;
wherein, on the masking approach indication field being indicative of a first status, the method comprises:
traversing all the nodes in the DOM tree;
creating an intermediate-node for each of the nodes in the DOM tree to form an intermediate tree representation corresponding to the DOM tree;
annotating each intermediate-node with a plurality of attributes associated with the corresponding node in the DOM tree, wherein the plurality of attributes comprises:
a type of node, one from a text node and an HTML element;
a sensitivity index of node based on the type of node and based on the main masking specification; and
a masking rule based on the sensitivity index of node and based on the main masking specification;
masking the nodes in the DOM tree based on the sensitivity index of node and the masking rule in the intermediate-nodes associated with the nodes, by:
identifying, by the processor, sensitive-intermediate-nodes in the intermediate tree representation as intermediate-nodes annotated with the sensitivity index as one of label-value sensitive, label sensitive, and value sensitive; and
maintaining, by the processor, the sensitive-intermediate-nodes with the plurality of attributes in a masking nodes list, for masking the nodes in the DOM tree,
wherein the masking of the nodes in the DOM tree comprises:
for each sensitive-intermediate-node, from the masking nodes list, fetching the masking rule associated with the sensitive-intermediate-node;
identifying, by the processor, from the masking rule, a direction of search for searching of the sensitive-intermediate-nodes which are value sensitive; and
masking values of the nodes in the DOM tree, corresponding to the sensitive-intermediate-nodes which are value sensitive.

2. The method as claimed in claim 1 further comprising:
identifying, by the processor, whether a root-node of the DOM tree has one or more child-nodes;
for each of the one or more child-nodes, identifying whether the child-node is one of a text-node and an HTML element-node; and
based on the identifying of the child-node as one of the text-node and the HTML element-node, annotating, by the processor, the intermediate-node corresponding to the child-node with the sensitivity index as one of the plurality of attributes.

3. The method as claimed in claim 2 further comprising:
based on the identifying of the child-node as a non-text-node, identifying whether the child-node has one or more further child-nodes;
for each of the further child-nodes, iteratively identifying, by the processor, whether the further child-node is one of a text-node and an HTML element-node;
based on the identifying of the further child-node as one of the text-node and the HTML element-node, annotating, by the processor, the intermediate-node corresponding to the further child-node with the sensitivity index as one of the plurality of attributes;
based on the identifying that the child-node has no further child-nodes, identifying, by the processor, whether the child-node has one or more sibling-nodes;
for each of the sibling-nodes, iteratively identifying, by the processor, whether the sibling-node is one of a text-node and an HTML element-node; and
based on the identifying of the sibling-node as one of the text node and the HTML element-node, annotating, by the processor, the intermediate-node corresponding to the sibling-node with the sensitivity index as one of the plurality of attributes.

4. The method as claimed in claim 1, wherein, on the direction of search being one of a right direction and a left direction, the masking of the values of the nodes in the DOM tree comprises:
fetching all sibling-intermediate-nodes of the sensitive-intermediate-node;
for each of the sibling-intermediate-nodes, iteratively identifying whether the corresponding sensitivity index, from the plurality of attributes in the masking nodes list, is value sensitive;
on the sensitivity index of a sibling-intermediate-node being value sensitive, fetching a masking logic from the masking rule associated with the sibling-intermediate-node and applying the masking logic for masking a value of the node in the DOM tree, associated with the sibling-intermediate-node;
for each of the sibling-intermediate-nodes, fetching all child-intermediate-nodes;
for each child-intermediate-node of the each of the sibling-intermediate-node, iteratively identifying whether the corresponding sensitivity index, from the plurality of attributes in the masking nodes list, is value sensitive; and
on the sensitivity index of the child-intermediate-node being value sensitive, fetching a masking logic from the masking rule associated with the child-intermediate-node and applying the masking logic for masking a value of the node in the DOM tree, associated with the child-intermediate-node.

5. The method as claimed in claim 1, wherein, on the direction of search being one of a down direction and an up direction, the masking of the values of the nodes in the DOM tree comprises:
fetching all parent-sibling-intermediate-nodes of the sensitive-intermediate-node;
for each of the parent-sibling-intermediate-nodes, fetching all child-intermediate-nodes;
for each child-intermediate-node of the each of the parent-sibling-intermediate-node, iteratively identifying whether the corresponding sensitivity index, from the plurality of attributes in the masking nodes list, is value sensitive; and
on the sensitivity index of the child-intermediate-node being value sensitive, fetching a masking logic from the masking rule associated with the child-intermediate-node and applying the masking logic for masking a value of the node in the DOM tree, associated with the child-intermediate-node.

6. The method as claimed in claim 1, wherein, on the masking approach indication field being indicative of a second status, the method comprises:
obtaining all the masking rules from the main masking specification;
identifying sensitive-nodes in the DOM tree based on location identification paths in the masking rules; and
masking values of the sensitive-nodes in the DOM tree based on the masking rules.

7. The method as claimed in claim 1 further comprising:
obtaining, by the processor, masking specification files comprising predefined masking specifications, for masking of the sensitive data in the response output, wherein the main masking specification is identified from the predefined masking specifications;
checking, by the processor, whether any of the predefined masking specifications is corrupted; and
setting, by the processor, corrupt flag associated with each of the predefined masking specifications based on the checking of the predefined masking specifications.

8. A dynamic data masking (DDM) system comprising:
a processor that is a hardware processor; and
a masking specification reading module coupled to the processor, the masking specification reading module is configured to obtain predefined masking specifications,
a response evaluation module coupled to the processor, the response evaluation module is configured to,
receive a response output comprising sensitive data, from an application, based on a query from a client to the application; and
identify a main masking specification, from the predefined masking specifications, based on the response output;
a fallback handling module coupled to the processor, the fallback handling module configured to,
check a status of a corrupt flag associated with the main masking specification; and
select a master masking specification as the main masking specification when the status of the corrupt flag is corrupted or tampered;
a parsing module coupled to the processor, the parsing module is configured to,
parse the response output for creating a Document Object Model (DOM) tree for the response output; and
check status of a masking approach indication field of the main masking specification when the status of the corrupt flag is not corrupt or tampered, the masking approach indication field being indicative of whether the main masking specification has information about location identification paths of nodes comprising the sensitive data in the DOM tree;
a masking module coupled to the processor, the masking module is configured to perform masking on the nodes in the DOM tree, wherein the masking is performed based on the masking approach indication field of the main masking specification; and
an annotating module coupled to the processor, wherein, on the masking approach indication field being indicative of a first status, the annotating module is configured to,
traverse all the nodes in the DOM tree;

create an intermediate-node for each of the nodes in the DOM tree to form an intermediate tree representation, wherein the intermediate-node is in the form of a metadata wrapper;

annotate each intermediate-node with a plurality of attributes associated with the corresponding node in the DOM tree, wherein the plurality of attributes comprises:

a type of node, one from a text node and an HTML element;

a sensitivity index of node based on the type of node and on the main masking specification; and a masking rule based on the sensitivity index of node and the main masking specification; and wherein the masking module is configured to mask the nodes in the DOM tree based on the sensitivity index of node and the masking rule in the intermediate-nodes associated with the nodes, wherein the masking module is configured to further:

identify sensitive-intermediate-nodes in the intermediate tree representation as intermediate-nodes annotated with the sensitivity index as one of label-value sensitive, label sensitive, and value sensitive; and store the sensitive-intermediate-nodes with the plurality of attributes in a masking nodes list, for the performing of masking on the nodes in the DOM tree, and wherein, for the performing of masking of the nodes in the DOM tree, the masking module is configured to, fetch, for each sensitive-intermediate-node in the DOM tree, the masking rule associated with the sensitive-intermediate-node, from the masking nodes list;

identify, from the masking rule, a direction of search for searching of sensitive-intermediate-node which are value sensitive; and mask values of the nodes in the DOM tree, corresponding to the sensitive-intermediate-node which are value sensitive.

9. The DDM system as claimed in claim 8, wherein the annotating module is configured to, identify whether a root-node of the DOM tree has one or more child-nodes;

identify, for each of the child-nodes, whether the child-node is one of a text-node and an HTML element-node; and based on the identification of the child-node as one of the text node and the HTML element-node, annotate the intermediate-node corresponding to the child-node with the sensitivity index as one of the plurality of attributes.

10. The DDM system as claimed in claim 9, wherein the annotating module is configured to, identify, based on the identification of the child-node as a non-text-node, whether the child-node has one or more further child-nodes;

iteratively identify, for each of the further child-nodes, whether the further child-node is one of a text-node and an HTML element-node; and based on the identification of the further child-node as one of the text node and the HTML element-node, annotate the intermediate-node corresponding to the further child-node with the sensitivity index as one of the plurality of attributes;

identify, based on the identification that the child-node has no further child-nodes, whether the child-node has one or more sibling-nodes;

iteratively identify, for each of the sibling-nodes, whether the sibling-node is one of a text-node and an HTML element-node; and based on the identification of the sibling-node as one of the text node and the HTML element-node, annotate the intermediate-node corresponding to the sibling-node with the sensitivity index as one of the plurality of attributes.

11. The DDM system as claimed in claim 8, wherein, on the masking approach indication field being indicative of a second status, the masking module is configured to, obtain all the masking rules from the main masking specification;

identify sensitive-nodes in the DOM tree based on location identification paths in the masking rules; and mask values of the sensitive-nodes in the DOM tree based on the masking rules.

12. The DDM system as claimed in claim 8, wherein the masking specification reading module is further configured to, check whether any of the predefined masking specifications is corrupted; and set a corrupt flag associated with each of the predefined masking specifications based on the checking of the predefined masking specifications.

13. The DDM system as claimed in claim 8 further comprising a performance evaluation module coupled to the processor, the performance evaluation module is configured to, determine a complexity of response output based on a total number of nodes in the DOM tree and on a number of nodes that are masked in the DOM tree; and evaluate a performance of the DDM system based on the complexity of response output.

14. The DDM system as claimed in claim 8, wherein the masking module is configured to generate a response stream based on the performing of the masking of nodes in the DOM tree, and the response evaluation module is configured to send the response stream to a client.

15. A non-transitory computer-readable medium having embodied thereon a computer program for executing a method comprising:

receiving a response output comprising sensitive data, from an application, based on a query from a client to the application;

identifying a main masking specification, based on the response output, for masking of the sensitive data in the response output;

checking a status of a corrupt flag associated with the main masking specification to ascertain whether the main masking specification is corrupted or tampered;

selecting a master masking specification as the main masking specification when the status of the corrupt flag is corrupted or tampered;

parsing the response output for creating a Document Object Model (DOM) tree for the response output;

checking status of a masking approach indication field of the main masking specification when the status of the corrupt flag is not corrupt or tampered, the masking approach indication field being indicative of whether the main masking specification has information about locations identification paths of nodes comprising the sensitive data in the DOM tree;

performing masking on the nodes in the DOM tree, wherein the performing of masking is based on the status of the masking approach indication field of the main masking specification; and wherein, on the masking approach indication field being indicative of a first status, the method comprises:

traversing all the nodes in the DOM tree;

creating an intermediate-node for each of the nodes in the DOM tree to form an intermediate tree representation corresponding to the DOM tree;
annotating each intermediate-node with a plurality of attributes associated with the corresponding node in the DOM tree, wherein the plurality of attributes comprises:
  a type of node, one from a text node and an HTML element;
  a sensitivity index of node based on the type of node and based on the main masking specification; and
  a masking rule based on the sensitivity index of node and based on the main masking specification;
masking the nodes in the DOM tree based on the sensitivity index of node and the masking rule in the intermediate-nodes associated with the nodes, by:
  identifying, by the processor, sensitive-intermediate-nodes in the intermediate tree representation as intermediate-nodes annotated with the sensitivity index as one of label-value sensitive, label sensitive, and value sensitive; and
  maintaining, by the processor, the sensitive-intermediate-nodes with the plurality of attributes in a masking nodes list, for masking the nodes in the DOM tree,
wherein the masking of the nodes in the DOM tree comprises:
  for each sensitive-intermediate-node, from the masking nodes list, fetching the masking rule associated with the sensitive-intermediate-node;
  identifying, by the processor, from the masking rule, a direction of search for searching of the sensitive-intermediate-nodes which are value sensitive; and
masking values of the nodes in the DOM tree, corresponding to the sensitive-intermediate-nodes which are value sensitive.

* * * * *